United States Patent [19]

Stroik

[11] 3,970,481

[45] July 20, 1976

[54] THERMOCOUPLE

[75] Inventor: Edward R. Stroik, Holland, Pa.

[73] Assignee: Tudor Technology, Inc., Horsham, Pa.

[22] Filed: Nov. 12, 1975

[21] Appl. No.: 631,222

[52] U.S. Cl. ............................... 136/230; 136/232; 136/233
[51] Int. Cl.² ....................... H01V 1/00; H01V 1/02
[58] Field of Search ..................... 136/230, 232, 233

[56] References Cited
UNITED STATES PATENTS

| | | | |
|---|---|---|---|
| 3,637,438 | 1/1972 | Springfield | 136/230 |
| 3,867,205 | 2/1975 | Schley | 136/232 |
| 3,890,162 | 6/1975 | Dawson et al. | 136/230 |

Primary Examiner—Leland A. Sebastian
Attorney, Agent, or Firm—Zachary T. Wobensmith, 2nd; Zachary T. Wobensmith, III

[57] ABSTRACT

An erodable thermocouple is disclosed having two dissimilar metal conductors, connected or not connected as desired at the ends exposed to the temperature to be measured, the conductors being electrically insulated from each other along their lengths by glass sleeving, one being helically mounted on the other, the conductors being encased within a tubular insulating enclosure and surrounded by a kraft paper tube, the insulating enclosure and tube being swaged to reduce its outside diameter, and having a short metal tube at its outer end. The paper tube burns upon exposure to furnace temperatures providing a slip plane for the thermocouple.

6 Claims, 6 Drawing Figures

U.S. Patent  July 20, 1976  3,970,481
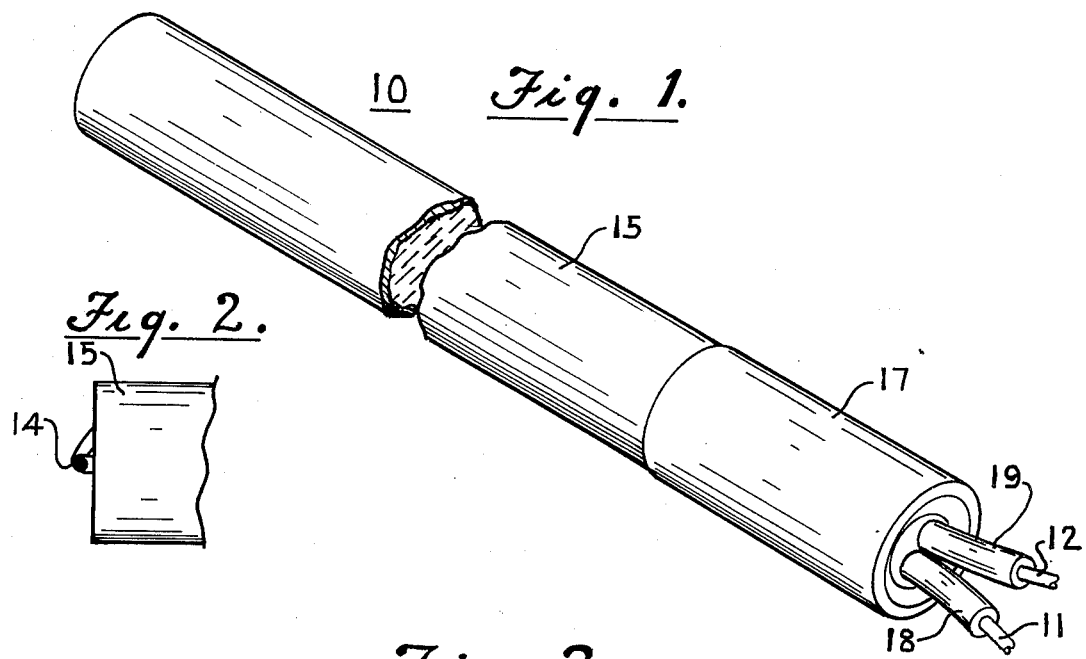
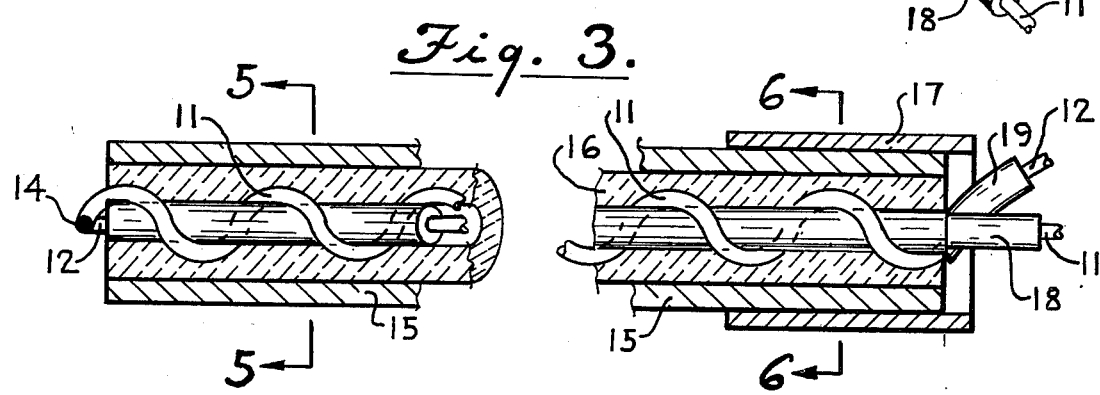
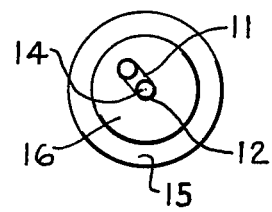
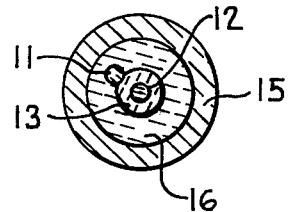
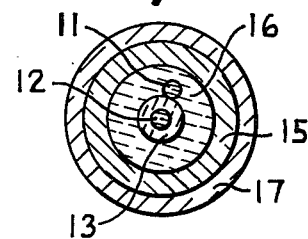

THERMOCOUPLE

BACKGROUND OF THE INVENTION

1. Field of the Invention

This invention relates to thermocouples and more particularly to a thermocouple which by reason of erosion substantially continuously provides a conducting path between the thermocouple wires.

2. Background of the Prior Art

The use of thermocouple wires to provide a continuous e.m.f. as a signal corresponding to the temperature of a heated surface in a furnace lining is well known.

It has been common practice to enclose the thermocouple within a protective metal tube as shown in the U.S. patents to Haselton, et al., U.S. Pat. No. 3,416,972, Scanlon, et al., U.S. Pat. No. 3,505,124, Inouye, U.S. Pat. No. 3,580,744, and Bingham, U.S. Pat. No. 3,317,453. Such metal tubes by reason of their heat conductivity along the thermocouple adversely affect the operation by reducing the temperature gradient along the thermocouple and introduce undesired chemical reactions at the exposed end.

It has also been proposed, as shown in the U.S. patents to Haselton, et al., U.S. Pat. No. 3,416,972, Black, et al., U.S. Pat. No. 3,463,674, and Bingham, No. 3,317,383 to surround one or both of the wires with compacted mineral oxide insulation. None of these thermocouples are intended to act nor are they capable of substantially continuously providing a conducting path between the wires.

Strimple, et al., in U.S. Pat. No. 3,845,706, show a thermocouple having a pair of dissimilar wires twisted on each other or parallel, at least one of the wires being insulated with glass insulating material such as a fiberglass sleeve. The wires are contained within an outer sleeve made of metallic or non-metallic material such as stainless steel or fiberglass of sufficient strength and rigidity to contain between the outer sleeve and the wires powdered refractory material consisting of chrome ore, chromium oxide or admixtures thereof, packed into the outer sleeve, for forming a conducting path upon heating of the glass insulating sleeve to relatively high temperatures in the presence of the chrome ore or chromium oxide.

The Strimple structure is difficult to maintain as to size and requires more space, is limited as to the selection of refractory material and this in turn does not permit of change of range and in its operation had more discontinuities in its action.

SUMMARY OF THE INVENTION

In accordance with the invention a thermocouple is provided which includes a pair of dissimilar wires, one of which is enclosed within glass sleeving and one of which is helically disposed around the other with widely spaced turns, the wires being encased within an enclosure of metallic oxide insulation and surrounded by a kraft paper tube, the enclosure and paper tube being swaged to reduce the diameter with compaction of the enclosure so as to be homogeneous, substantially free from powdering, and self supporting upon burning off of the paper tube when subjected to the temperatures encountered in the furnace.

It is the principal object of the invention to provide a thermocouple which is substantially free from heat transfer along its outer covering, and in which the wires are subject to electrical conduction at their measuring junction and along their lengths.

It is a further object of the invention to provide a thermocouple and insulating materials which in the presence of eroding action cause a continuous measuring junction formation.

It is a further object of the invention to provide a thermocouple for use with high furnace temperatures such as those in steel furnaces and which is reliable in its action over a very substantial portion of its length.

It is a further object of the invention to provide a thermocouple of the character aforesaid which has a quick time response to rapid temperature changes.

It is a further object of the invention to provide a thermocouple having a steep temperature gradient from the measuring junction to a point therealong spaced from the junction.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which:

FIG. 1 is a perspective view of a thermocouple in accordance with the invention;

FIG. 2 is a fragmentary elevational view showing the measuring junction;

FIG. 3 is a longitudinal sectional view of the thermocouple of FIG. 1;

FIG. 4 is an end elevational view of the measuring junction end;

FIG. 5 is a transverse sectional view taken approximately on the line 5—5 of FIG. 3; and FIG. 6 is a transverse sectional view taken approximately on the line 6—6 of FIG. 3.

It should, of course, be understood that the description and drawings herein are illustrative merely and that various modifications and changes can be made in the structure disclosed without departing from the spirit of the invention.

DESCRIPTION OF THE PREFERRED EMBODIMENT

Referring now more particularly to the drawings a thermocouple in accordance with the invention is shown at 10 and includes dissimilar metal wires 11 and 12 for generating an electromotive force (e.m.f.) in the presence of heat. The metal wires 11 and 12 can be of any of the metals now commonly employed for thermocouples. For this purpose one of the wires can be of platinum and the other can be of platinum with a 13 percent alloy of rhodium. One of the wires 11 and 12, and preferably the wire 12, is provided with an insulating covering 13 of glass insulating sleeving, preferably of glass fibers. The inner ends of the wires 11 and 12 are preferably initially secured together as at 14. One of the wires and preferably the wire 11 is disposed helically along the other in tight contact with the covering 13 and in a particular embodiment the helix has about three turns per inch.

In the making of the thermocouple 10 tubular insulators of the desired composition can be strung onto the wires 11 and 12 after the helix has been formed, a commercially available kraft paper tube 15 which can be a spirally wound tube is exteriorly mounted thereon and the tube 15 and insulators are swaged or otherwise reduced in diameter by about 30 percent.

If desired, the tube 15 can be placed in surrounding relation to the wires 11 and 12 after formation of the helix, the interior tightly packed with the desired insulating material and the assembly compacted for diameter reduction as before.

In a specific embodiment the final exterior diameter can be three sixteenths of an inch and the total length can be 16 inches.

The insulation can be composed of any desired material which upon compaction, as indicated at 16, will provide heat and electrical insulation around the wires 11 and 12, will be self sustaining, and will become conductive at temperatures at or near the melting point of steel while retaining good insulating qualities below temperatures of 1900° F. to ambient. Suitable materials for this purpose include silicon oxide, in the form of solid or fibrous glass, magnesium oxide, zirconium oxide and aluminum oxide, or mixtures thereof and with additives to modify the reaction temperatures.

The outer end of the thermocouple 10 preferably has a stainless steel tube 17 secured thereto in any desired manner such as by an epoxy resin. The tube 16 in the specific embodiment heretofore referred to can have a length of about 4 inches, an exterior diameter of one-quarter of an inch and a thickness of the order of two one-hundredths of an inch.

Identifying sleeves 18 and 19 coded as to color, such as red and black, can be applied to the wire 11 and the covered wire 12 with the free ends of the wires 11 and 12 for connection to a desired voltage measuring instrument (not shown).

In use, and upon insertion at the location where temperature measurements in terms of e.m.f. are desired, and with the free end of the thermocouple 10 exposed to the heated location, the kraft paper tube 15 will burn back to the tube 17 leaving a carbonaceous covering around the tubular compacted oxide 16. The carbonaceous covering may tend to form an electrical conducting path but its major role is to reduce heat conduction along the length of the thermocouple 10, to provide a slip plane and to contain the oxide 16.

The glass sleeving 13 on the wire 12 allows the thermocouple wires 11 and 12 to be closely twisted and still remain electrically insulated from each other.

Under high heat conditions the glass sleeving 13 at an exposed location loses its insulating qualities sooner than the tubular compacted insulating material 16 at a contiguous exposed location and continuously forms a measuring junction between the two thermocouple wires 11 and 12 thereby maintaining a measuring junction to take the place of the junction which has been removed by erosion.

It is essential for proper thermocouple operation that the steepest possible temperature gradient be maintained between the measuring junction of the wires 11 and 12 and a location just outwardly thereof along the thermocouple.

The use of the destructable kraft paper tube 15 in place of an outer metal shield, as heretofore, and the heat dissipation by the oxide tube 16 into the surround areas aid in maintaining such desired steep temperature gradient. The length of the self-forming junction is also kept short and this contributes to maintaining the desired steep gradient. The short length of the self-forming junction also makes for faster time response.

The measuring junction can be taken as that length of the two thermocouple conductors 11 and 12 that are joined together electrically within the measuring limits of measuring instrumentation. The effects of insulating vs. non-insulating qualities of magnesium oxide as related to temperature gradients inwardly along the thermocouple at spaced locations (1,2,3) from the junction (j) can be seen from the following tabulation:

| Temperature (F) | Resistance (Ohms) |
|---|---|
| Tj 3000°F+ | 0 |
| T1 2500°F | 50 |
| T2 2000°F | 1500 |
| T3 1500°F | 50000 |

Other oxides have similar behavior patterns.

It will thus be seen that a thermocouple has been described with which the objects of the invention are attained.

I claim:

1. A temperature responsive device comprising
   a pair of elongated dissimilar metallic wires having an inner measuring terminal portion at which said wires are in contact providing a signal at elevated temperatures,
   one of said wires having an insulating covering thereon and one of said wires being helically wound onto the other,
   a surrounding enclosure extending along said wires of compacted self-sustaining normally non-electrically conductive material, and
   an exterior cover of readily combustible material extending along said enclosure.

2. A temperature responsive device as defined in claim 1 in which
   said exterior cover is of kraft paper.

3. A temperature responsive device as defined in claim 1 in which
   said exterior cover is a kraft paper tube.

4. A temperature responsive device as defined in claim 1 in which
   said insulating cover provides means for advancing said measuring terminal portion rearwardly along said wires upon subjection to a predetermined temperature.

5. A temperature responsive device as defined in claim 1 in which
   said surrounding enclosure and said insulating cover provide means for advancing said measuring terminal portion rearwardly along said wires upon erosion of inner exposed portions of said enclosure and upon subjection of said insulating cover to a predetermined temperature 6. A temperature responsive element as defined in claim 1 in which
   said surrounding enclosure is of a material from the group consisting of silicon oxide, magnesium oxide, zirconium oxide and aluminum oxide, and mixtures thereof.

* * * * *